United States Patent [19]
Lara et al.

[11] Patent Number: 5,343,295
[45] Date of Patent: Aug. 30, 1994

[54] OPTICAL SYSTEM FOR ELECTRIC VEHICLE DOCKING

[75] Inventors: Jess D. Lara, Alhambra; Mario Palombo, Manhattan Beach, both of Calif.

[73] Assignee: Hughes Aircraft Company, Los Angeles, Calif.

[21] Appl. No.: 992,393

[22] Filed: Dec. 18, 1992

[51] Int. Cl.$^5$ .............................................. G01B 11/00
[52] U.S. Cl. .................................. 356/399; 356/153
[58] Field of Search ............... 356/1, 373, 375, 399, 356/153; 378/206

[56] References Cited

U.S. PATENT DOCUMENTS

| | | | |
|---|---|---|---|
| 1,349,336 | 8/1920 | Haddock | 356/1 |
| 2,316,751 | 4/1943 | Adler, Jr. | 356/1 |
| 2,659,824 | 11/1953 | Burnham | 378/206 |
| 3,152,317 | 10/1964 | Mayer | 356/1 |
| 3,710,798 | 1/1973 | Bredemeir | 385/33 |
| 3,904,280 | 9/1975 | Tate, Jr. | 356/1 |
| 3,910,533 | 10/1975 | Cheatham | 356/153 |
| 4,039,894 | 8/1977 | Gardner, III | 315/76 |
| 5,068,887 | 11/1991 | Hughes | 378/206 |

FOREIGN PATENT DOCUMENTS 1405241 5/1965 France .................. 356/153

*Primary Examiner*—F. L. Evans
*Attorney, Agent, or Firm*—Michael W. Sales; Wanda K. Denson-Low

[57] ABSTRACT

Disclosed is an apparatus and method for positioning an electric powered vehicle (34) relative to an electric recharging unit (36) utilizing an optical docking system (10). A first laser emitting diode (12) generates a first visible beam (18) and a second laser emitting diode (14) generates a second visible beam (20). The first visible beam (18) and the second visible beam (20) intersect at an intersection point (22) remote from the electric powered vehicle (34). This intersection point (22) is aligned with the electric recharging unit (36) thereby positioning the electric powered vehicle (34) at a predetermined distance and a predetermined position relative to the electric recharging unit (36).

16 Claims, 2 Drawing Sheets

OPTICAL SYSTEM FOR ELECTRIC VEHICLE DOCKING

BACKGROUND OF THE INVENTION

1. Technical Field

This invention relates generally to an optical system for positioning a first object in relation to a second object, and more particularly, to an optical docking system for positioning an electric powered vehicle in relation to an electric recharging unit.

2. Discussion of the Related Art

Several docking and positioning devices are known in the art for accurately positioning a movable vehicle in relation to a non-movable second object. This typically occurs when the vehicle requires refueling or maintenance. For example, this may include the positioning of a vehicle relative to: a fuel pump for refueling; a hoist to vertically raise the vehicle; an alignment rack to align the wheels of the vehicle; and a vehicle monitoring and test device to diagnose and repair malfunctions of the vehicle. Moreover, with the advent of new generation longer range electric powered vehicles being aggressively pursued by many vehicle manufacturers, there is a new need to provide a docking and positioning device to position an electric powered vehicle in relation to an electric recharging unit. This will ultimately provide a safe, easy and reliable means of assuring that the batteries of these vehicles are charged and ready for daily use. Without this assurance, the usage of electric powered vehicles will be impractical.

Some currently existing techniques used for docking and positioning a vehicle relative to a specific location include: a pneumatic hose which rings a bell when a vehicle tire contacts it; a suspended ball or rod that comes in contact with a windshield of the vehicle when the proper distance has been attained; guides or channels in a floor to position the tires of the vehicle; external mirrors for visually estimating the position of the vehicle; and bumpers in which the vehicle tires engage to position the vehicle. Each of these techniques either provides audible, visual or mechanical indication as to the position of the vehicle relative to a specific location. However, each of these devices have various disadvantages associated with their use. One major disadvantage is that each device is vehicle type and structure specific, thereby requiring adjustments or modifications of the devices for each vehicle. Another disadvantage is that each device requires an external apparatus to position the vehicle. Still another disadvantage is that some of these devices are contact dependent, which requires the vehicle to contact a locator device. Yet still another disadvantage of these devices is that they do not provide a continuous visual feedback during positioning of the vehicle, thereby making the positioning less precise and more difficult to achieve.

The currently existing docking and positioning devices described above each positions a vehicle relative to another object. However, each device has various disadvantages associated with its use that affect either the reliability, cost, size, accuracy, versatility, ease of operation, or any combination thereof. More importantly, these devices do not allow the positioning of the vehicle to be gaged directly from the point of interest, such as a charging receptacle of the electric powered vehicle.

What is needed then is a simple, cost effective optical docking system which is capable of accurately positioning an electric powered vehicle in relation to an electric recharging unit. It is therefore an object of the present invention to provide such a device.

SUMMARY OF THE INVENTION

In accordance with the present invention, an optical system for electric vehicle docking is utilized to position an electric powered vehicle in relation to an electric recharging unit. This result is basically achieved by aligning an intersection point of two visible beams radiating from the electric powered vehicle with a recharging head of the electric recharging unit. This ultimately allows a driver of the electric powered vehicle to easily and accurately position the electric powered vehicle in relation to the electric recharging unit.

In one preferred embodiment, a first laser emitting diode and a second laser emitting diode positioned on a front of the electric powered vehicle generates a first visible beam and a second visible beam. The first visible beam and the second visible beam intersect at an intersection point remote from the electric powered vehicle. An alignment marker is positioned on the recharging head of the electric recharging unit for aligning the intersection point of the first visible beam and the second visible beam. As the electric powered vehicle approaches the electric recharging unit, a first visible beam spot from the first visible beam and a second visible beam spot from the second visible beam converge as the intersection point is aligned with the alignment marker. This ultimately positions the electric powered vehicle at a predetermined distance and a predetermined position relative to the electric recharging unit.

Use of the present invention results in easily and accurately positioning the electric powered vehicle in relation to the electric recharging unit, thereby allowing the electric powered vehicle to be recharged. As a result, the aforementioned disadvantages associated with the currently available docking systems have been substantially eliminated.

BRIEF DESCRIPTION OF THE DRAWINGS

Still other advantages of the present invention will become apparent to those skilled in the art after reading the following specifications and by reference to the drawings in which.

DETAILED DESCRIPTION OF THE PREFERRED EMBODIMENT

The following description of the preferred embodiment concerning optical docking systems is merely exemplary in nature and is in no way intended to limit the invention or its application of uses. Moreover, the present invention is described in detail below with reference to positioning an electric powered vehicle in relation to an electric recharging unit, however, it will be appreciated by those skilled in the art that the present invention, as defined by the appended claims, is clearly not limited to this particular application.

Figure 1B:
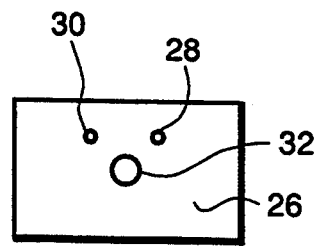
FIG. 1B is a front view of a recharging head of an electric recharging unit displaying a first visible beam spot and a second visible beam spot appearing on the recharging head.
Figure 1A:
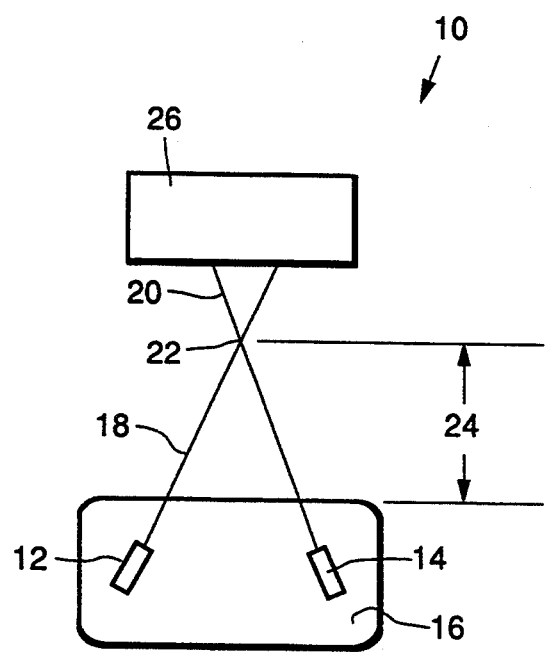
FIG. 1A is a ray trace schematic/block diagram of one preferred embodiment of the present invention displaying an intersection point of a first visible beam and a second visible beam.

Referring to FIG. 1A, one preferred embodiment of an optical docking system 10 is shown. The optical docking system 10 includes a first laser emitting diode 12 and a second laser emitting diode 14, secured to a charging receptacle 16 of an electric powered vehicle (not shown in FIG. 1A). The first laser emitting diode 12 generates a first visible beam 18, preferably radiating in the red visible range. The second laser emitting diode 14 generates a second visible beam 20, also preferably radiating in the red visible range. The first visible beam 18 and the second visible beam 20 are red high intensity beams which are operable to be seen either in the daylight or evening.

The first laser emitting diode 12 and the second laser emitting diode 14 are adjustably secured to the charging receptacle 16 by a pair a pivotable members (not shown). The pair of pivot members allows the first laser emitting diode 12 and the second laser emitting diode 14 to be angled towards each other such that the first visible beam 18 and the second visible beam 20 intersect at an intersection point 22. Since the angle of the first laser emitting diode 12 and the angle of the second laser emitting diode 14 can be adjusted, the intersection point 22 can be moved relative to the charging receptacle 16, thereby adjusting a positioning range 24.

Figure 2B:
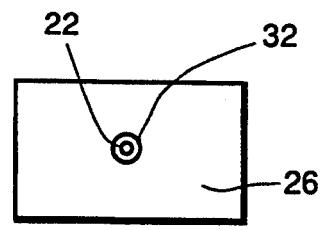
FIG. 2B is a front view of the recharging head of the electric recharging unit displaying the intersection point of the first visible beam and the second visible beam aligned on an alignment marker.
Figure 2A:
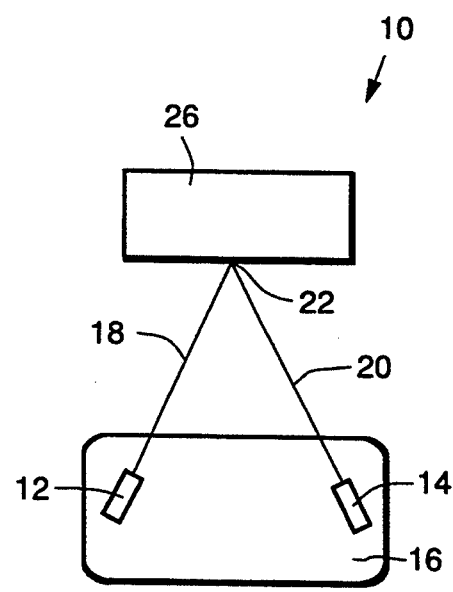
FIG. 2A is a ray trace schematic/block diagram of one preferred embodiment of the present invention displaying the intersection point of the first visible beam and the second visible beam aligned with the electric recharging unit.

The first visible beam 18 and second visible beam 20 are directed toward a recharging head 26 of an electric recharging unit (not shown in FIG. 1A). This causes a first visible beam spot 28 from the first visible beam 18 and a second visible beam spot 30 from the second visible beam 20 to appear on the face of the recharging head 26, shown clearly in FIG. 1B. The first visible beam spot 28 and the second visible beam spot 30 are approximately one-half inch ($\frac{1}{2}''$) in diameter and can be seen from approximately twenty-five feet (25') away. As the charging receptacle 16 approaches the recharging head 26, the first visible beam spot 28 and the second visible beam spot 30 start to converge or merge upon one another until the intersection point 22 is aligned with an alignment marker 32. This condition can be seen clearly in FIGS. 2A and 2B, wherein the intersection point 22 is shown aligned with the recharging head 26 at the alignment marker 32.

Figure 3:
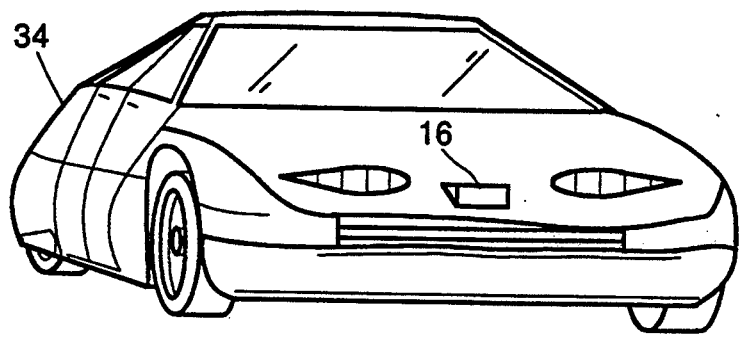
FIG. 3 is a front perspective view of an electric powered vehicle employing one preferred embodiment of the present invention.
Figure 4A:
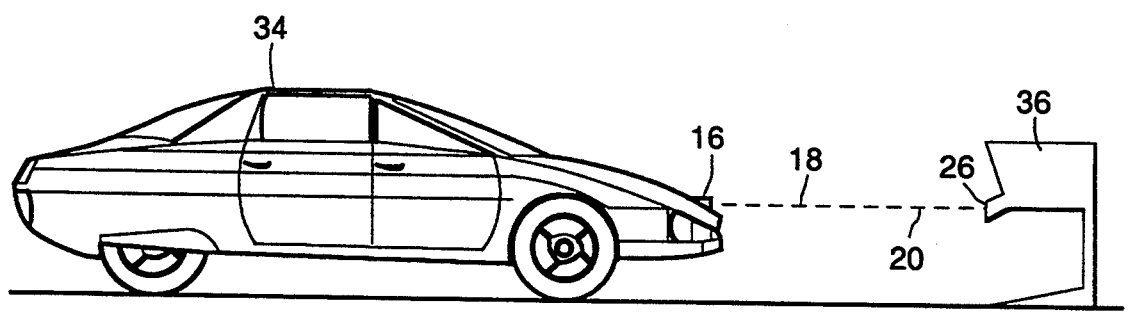
FIG. 4A is a side perspective view of the electric powered vehicle as it approaches the electric recharging unit.
Figure 4B:
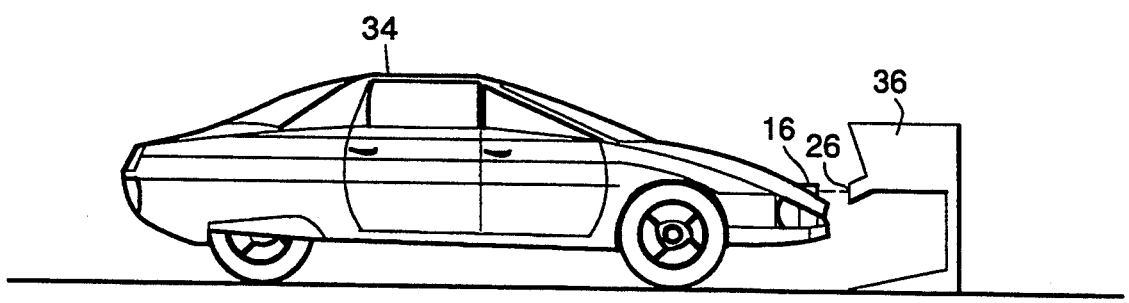
FIG. 4B is a side perspective view of the electic powered vehicle aligned with the electric recharging unit.

Referring to FIG. 3, an electric powered vehicle 34 is shown which houses the charging receptacle 16. In operation, a driver positioned within the electric powered vehicle 34 turns on the first laser emitting diode 12 and the second laser emitting diode 14. The driver then approaches an electric recharging unit 36, shown clearly in FIGS. 4A–4B, in order to recharge the batteries of the electric powered vehicle 34. As the driver approaches the electric recharging unit 36, shown clearly in FIG. 4A, the driver directs the first visible beam 18 and second visible beam 20, radiating from charging receptacle 16, toward the recharging head 26 of the electric recharging unit 36. When this is done, the driver will observe the first visible beam spot 28 and second visible beam spot 30 appearing on the face of the recharging head 26, as shown in FIG. 1B. As the electric powered vehicle 34 advances toward the electric recharging unit 36, the driver will observe the first visible beam spot 28 and the second visible beam spot 30 converging on one another. While this is occurring, the driver will align the intersection point 22 with the alignment marker 32, thereby placing the electric powered vehicle 34 in the appropriate positioning range 24 with the electric recharging unit 36. This ultimately enables the electric powered vehicle 34 to be recharged by the electric recharging unit 36, shown clearly in FIG. 4B.

It should be noted that prior to aligning the intersection point 22 with the alignment marker 32, the angle of the first laser emitting diode 12 and the angle of the second laser emitting diode 14 are adjusted to achieve the appropriate distance between the intersection point 22 and the electric powered vehicle 34. Moreover, since the intersection point 22 is easily adjusted relative to the electric vehicle 34, one skilled in the art would readily recognize that this device is quite versatile since any type vehicle configuration or electric recharging unit configuration can be utilized by merely adjusting the positioning range 24.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined by the following claims.

What is claimed is:

1. An optical docking system for providing accurate positioning of an electric powered vehicle in relation to an electric recharging unit, said optical docking system comprising:

first visual indicator means for generating a first visible beam, said first visual indicator means positioned on a front of the electric powered vehicle;

second visual indicator means for generating a second visible beam, said second visual indicator means also positioned on the front of the electric powered vehicle, wherein the first visible beam and the second visible beam intersect at an intersection point remote from the electric powered vehicle; and target means for receiving the first visible beam and the second visible beam, said target means positioned on the electric recharging unit, wherein the target means provides a visual target for aligning the intersection point of the first visible beam and the second visible beam to position the electric powered vehicle at a predetermined distance and a predetermined position relative to the electric recharging unit.

2. The optical docking system as defined in claim 1 wherein the first visual indicator means includes a first laser emitting diode operable for generating the first visible beam.

3. The optical docking system as defined in claim 2 wherein the second visual indicator means includes a second laser emitting diode operable for generating the second visible beam.

4. The optical docking system as defined in claim 3 wherein the first laser emitting diode and the second laser emitting diode both radiate in the red visible range.

5. The optical docking system as defined in claim 1 wherein the target means includes an alignment marker for aligning the intersection point of the first visible beam and the second visible beam.

6. An optical docking system for providing accurate positioning of an electric powered vehicle in relation to an electric recharging unit, said optical docking system comprising:

a first laser emitting diode operable to generate a first visible beam, said first laser emitting diode positioned on a front of the electric powered vehicle;

a second laser emitting diode operable to generate a second visible beam, said second laser emitting diode also positioned on the front of the electric powered vehicle, wherein the first visible beam and the second visible beam intersect at an intersection point remote from the electric powered vehicle; and target means for receiving the first visible beam and the second visible beam, said target means positioned on the electric recharging unit, wherein the target means includes an alignment marker for aligning the intersection point of the first visible beam and the second visible beam to position the electric powered vehicle at a predetermined distance and a predetermined position relative to the electric recharging unit.

7. The optical docking system as defined in claim 6 wherein the first laser emitting diode and the second laser emitting diode are angled towards each other in order to cause the first visible beam and the second visible beam to intersect at the intersection point remote from the electric powered vehicle.

8. The optical docking system as defined in claim 7 wherein the first laser emitting diode and the second laser emitting diode are operable to move the intersection point of the first visible beam and the second visible beam relative to the electric powered vehicle.

9. The optical docking system as defined in claim 6 wherein the target means for receiving the first visible beam and the second visible beam is positioned on a recharging head of the electric recharging unit.

10. The optical docking system as defined in claim 6 wherein the first laser emitting diode and the second laser emitting diode are positioned on a charging receptacle of the electric powered vehicle.

11. A method of positioning an electric powered vehicle relative to an electric recharging unit, said method comprising the steps of:

providing a first visual indicator means for generating a first visible beam, said first visual indicator means positioned on the electric powered vehicle;

providing a second visual indicator means for generating a second visible beam, said second visual indicator means also positioned on the electric powered vehicle;

causing the first visible beam and the second visible beam to intersect at an intersection point remote from the electric powered vehicle;

providing a target means for receiving the first visible beam and the second visible beam, said target means positioned on the electric recharging unit; and aligning the intersection point of the first visible beam and the second visible beam with the target means to position the electric powered vehicle at a predetermined distance and a predetermined position relative to the electric recharging unit.

12. The method as defined in claim 11 wherein the step of causing the first visible beam and the second visible beam to intersect include the step of:

angling the first visual indicator means and the second visual indicator means towards each other.

13. The method as defined in claim 12 wherein the step of angling the first visual indicator means and the second visual indicator means towards each other includes the step of:

adjusting the angle of the first visual indicator means and the second visual indicator means to move the intersection point of the first visible beam and the second visible beam relative to the electric powered vehicle.

14. The method as defined in claim 11 wherein the steps of providing the first visual indicator means and the second visual indicator means includes the steps of:

providing a first laser emitting diode for generating the first visible beam; and providing a second laser emitting diode for generating the second visible beam.

15. The method as defined in claim 11 wherein the step of providing the target means includes the steps of:

providing an alignment marker for aligning the intersection point of the first visible beam and the second visible beam; and aligning said intersection point of the first visible beam and the second visible beam with the alignment marker.

16. The method as defined in claim 15 wherein the step of aligning said intersection point of the first visible beam and the second visible beam with the alignment marker further includes the step of:

advancing the electric powered vehicle toward the electric recharging unit to align said intersection point of the first visible beam and the second visible beam with the alignment marker.

* * * * *